United States Patent
Jeon et al.

(10) Patent No.: US 8,695,017 B2
(45) Date of Patent: Apr. 8, 2014

(54) METHOD AND SYSTEM FOR INTERWORKING A PLURALITY OF APPLICATIONS

(75) Inventors: Yun Ho Jeon, Seoul (KR); Eun Ah Kim, Seoul (KR); Su Jin Kim, Goyang-si (KR)

(73) Assignee: Intel Corporation, Santa Clara, CA (US)

( * ) Notice: Subject to any disclaimer, the term of this patent is extended or adjusted under 35 U.S.C. 154(b) by 1421 days.

(21) Appl. No.: 11/813,295

(22) PCT Filed: Jan. 10, 2006

(86) PCT No.: PCT/KR2006/000093
§ 371 (c)(1),
(2), (4) Date: Jul. 3, 2007

(87) PCT Pub. No.: WO2006/075859
PCT Pub. Date: Jul. 20, 2006

(65) Prior Publication Data
US 2008/0168474 A1     Jul. 10, 2008

(30) Foreign Application Priority Data
Jan. 11, 2005  (KR) .................. 10-2005-0002696

(51) Int. Cl.
G06F 3/00    (2006.01)
G06F 9/44    (2006.01)
G06F 9/46    (2006.01)
G06F 13/00   (2006.01)

(52) U.S. Cl.
USPC ......................................................... 719/320

(58) Field of Classification Search
USPC .................................. 719/320; 715/825, 828
See application file for complete search history.

(56) References Cited

U.S. PATENT DOCUMENTS 5,041,967 A * 8/1991 Ephrath et al. ................ 715/825
5,572,648 A * 11/1996 Bibayan ........................ 715/825
(Continued)

FOREIGN PATENT DOCUMENTS

| JP | 11-143695   | 5/1999  |
| JP | 2001-202257 | 7/2001  |
| JP | 2004-341999 | 12/2004 |

OTHER PUBLICATIONS

Hiroshi et al., JP1997-312297, "Detailed Description", translated Dec. 6, 2011, JPO and INPIT, English Translation, pp. 1-10.*

*Primary Examiner* — Emerson Puente
*Assistant Examiner* — Kimbleann Verdi
(74) *Attorney, Agent, or Firm* — Æ ON Law; Adam L.K. Philipp

(57) ABSTRACT

An application interoperation method includes: maintaining a handler table including data type information, function information and calling information associated with each application installed in a portable device; receiving input information on a menu key of the portable device, from a user, while a first application is active; extracting, in response to the receipt of the input information, at least one function information associated with data type information, which is being processed or requested by the first application, from the handler table; dynamically generating a menu including the extracted function information to provide the user with the generated menu; receiving selection information on particular function information among the provided menu, from the user; and identifying calling information associated with the selected particular function information by referring to the handler table and executing a second application on the basis of the identified calling information.

18 Claims, 6 Drawing Sheets

(56) References Cited

U.S. PATENT DOCUMENTS

| | | | |
|---|---|---|---|
| 5,922,054 A * | 7/1999 | Bibayan | 719/328 |
| 6,496,979 B1 * | 12/2002 | Chen et al. | 717/178 |
| 6,584,507 B1 * | 6/2003 | Bradley et al. | 709/229 |
| 6,910,210 B1 * | 6/2005 | Chew | 718/103 |
| 7,057,606 B2 * | 6/2006 | Numano | 345/173 |
| 7,925,305 B2 * | 4/2011 | Honda | 455/566 |
| 2002/0105681 A1 * | 8/2002 | Iyoki | 358/442 |
| 2003/0097486 A1 | 5/2003 | Eisenstein et al. | |
| 2003/0222923 A1 * | 12/2003 | Li | 345/815 |
| 2005/0066335 A1 * | 3/2005 | Aarts | 719/316 |

* cited by examiner

FIG. 2

| APPLICATION | DATA TYPE INFORMATION (201) | | FUNCTION INFORMATION (202) | CALLING INFORMATION (203) |
|---|---|---|---|---|
| | INPUT DATA TYPE | OUTPUT DATA TYPE | | |
| ... | ... | ... | ... | ... |
| CYWORLD | | — | POST A PICTURE TO CYWORLD | CYWORLD -P %1 |
| CYWORLD | | — | WRITE A MEMO IN CYWORLD | CYWORLD -T %1 |
| CYWORLD | | — | VISIT A HOMEPAGE | CYWORLD -H %1 |
| ... | ... | ... | ... | ... |

FIG. 5

| APPLICATION | DATA TYPE INFORMATION (501) | | FUNCTION INFORMATION | CALLING INFORMATION |
| --- | --- | --- | --- | --- |
| | INPUT DATA TYPE | OUTPUT DATA TYPE | | |
| ... | ... | ... | ... | ... |
| PHOTOFRAME | IMAGE /JPEG | IMAGE /JPEG | FRAME EFFECT | PHOTOFRAME %1 %2 |
| RESIZE | IMAGE /JPEG | IMAGE /JPEG | SIZE CHANGE | CYWORLD %1 %2 |
| ... | ... | ... | ... | ... |

METHOD AND SYSTEM FOR INTERWORKING A PLURALITY OF APPLICATIONS

TECHNICAL FIELD

The present invention relates to a method and system for interoperation of a plurality of applications by a dynamically generated menu in an application utilized in a portable device.

BACKGROUND ART

A browser for the wireless Internet (e.g., Wireless Application Protocol (WAP) browser), or an application embodying a particular function (application program) is generally utilized to use various functions in a portable device. The application is divided into two types of applications. One is an application which is installed in a portable device during manufacturing thereof (hereinafter, referred to as "embedded application"). The other is an application which is downloaded and installed by a method such as the Internet while the application is being used (hereinafter, referred to as "download application").

In the case of the embedded application, it is possible to know what type of application is installed, at a point in time when the application is installed in a portable device. Accordingly, the application may be manufactured to call another application as necessary. As an example, while a phone book application installed in a portable device is active, a user selects one telephone number and presses a menu key. Then, a menu capable of transmitting a short messaging service (SMS) to the selected telephone number may be provided to the user.

However, new services for mobile phones are being continuously released. Also, many services utilize a download application. In the case of a download application which is downloaded and installed after a mobile phone has been released, it is not possible to forecast interoperability of an application in the released mobile phone. Accordingly, interoperation between applications as described above is impossible.

A Graphic User Interface (GUI) operating system of a desktop computer, such as a personal computer, has provided various methods enabling an efficient interoperation between various applications. (1) A copy & paste method via a clipboard, (2) a share method via a file, and (3) a method of using a shell are representative examples.

In the case of the method (1), if a user selects and copies a portion of data or selects and copies all data while one application is active, the selected data is copied to a clipboard area of an operating system. After this, when pasting to another application, data of the clipboard is inserted into the other application. Accordingly, the user does not need to input data separately.

In the case of the method (2), if data is stored in a file system in one application, the stored data may be read by another application. In this instance, an extension of a file name may be utilized as a representative method for determining a data type which can be processed in another application.

In the case of the method (3), a shell which is a program operating with a GUI at all times is utilized. As an example, if an application is installed in currently widely used Microsoft Windows and the application is registered as a handler with respect to a data file having a particular extension, a menu is displayed when a user selects the file having the particular extension via a file search and presses a right button of a mouse. In this instance, the handler of the data file is included in the menu. The user selects one file in the menu and a handler application processes the selected file.

The methods as described above have been limitedly utilized in a mobile phone. This is because the operating system of the mobile phone has not generally provided a corresponding function for applications. Also, a user interface of the mobile phone is mainly for tasks and has almost no shell functions which can generally browse or process data files.

DISCLOSURE OF INVENTION

Technical Goals

The present invention is conceived to solve the aforementioned problems in the conventional art. The present invention provides an application interoperation method and system, which can dynamically generate a menu of an application according to a type of data that a user is currently using and an application installed in a terminal device, in a portable device having a limited input/output device but capable of utilizing various applications, thereby enabling interoperation of at least two applications. This is to improve efficiency of the terminal device and the application.

The present invention also provides an application interoperation method and system which enables one application to interoperate with another application when transmitting/receiving data, and also adopts a method of not hard-coding an association method in a logic of an application. This is to enable an association between download applications or an association between an embedded application and a download application. Also, this is to help a user to more easily and effectively utilize a portable device.

The present invention also provides an application interoperation method and system which can dynamically generate a menu of a currently active application, with respect to a portable device having almost no function corresponding to a shell or having difficulty of switching between an application and a shell.

The present invention also provides an application interoperation method and system which is not limited to a particular function, and can process, generate and refine data by including both input data and output data types.

The present invention also provides an application interoperation method and system which can reduce user manipulation by directly executing another application, while not terminating one application and also can increase efficient utilization of an application.

Technical Solutions

To achieve the above objectives and solve the aforementioned problems in the conventional art, according to an aspect of the present invention, there is provided an application interoperation method comprised of a series of steps. The method begins by maintaining a handler table which includes data type information, function information, and calling information. Each information type is associated with each application installed in a portable device. Then, at least one function information is extracted from the handler table in response to the receipt of the input information. The function information is associated with data type information of data, which the first application is processing or requesting. A menu is then dynamically generated which includes the extracted function information to provide the user with the generated menu. Selection information is then received from the user on particular function information among the provided menu. Calling information associated with the selected particular function information is then identified by referring to the handler table and executing a second application on the basis of the identified calling information.

According to another aspect of the present invention, the executing of the second application further includes the steps of: generating a predetermined command on the basis of an application identifier or an option identifier included in the identified calling information and executing a second application corresponding to the application identifier included in the command. The method further includes the step of the second application recognizing the command and performing a function according to the selected particular function information.

According to still another aspect of the present invention, there is provided an application interoperation system including: a table maintenance unit maintaining a handler table including data type information, function information and calling information which are associated with each application installed in a portable device. The application interoperation system also includes an input information receiving unit which receives input information on a menu key of the portable device from a user while a first application is active. The application interoperation system also includes a function information extraction unit extracting at least one function information associated with data type information of data, which is being processed or requested by the first application, from the handler table, in response to the receipt of the input information. The application interoperation system also includes a menu providing unit which dynamically generates a menu that includes the extracted at least one function information and provides the user with the generated menu. The application interoperation system also includes a selection information receiving unit that receives selection information on particular function information among the provided menu, from the user; and an application execution unit which identifies calling information associated with the selected particular function information by referring to the handler table and executing a second application on the basis of the identified calling information.

BRIEF DESCRIPTION OF DRAWINGS

FIG. 2 is a diagram illustrating an example of a handler table according to an embodiment of the present invention;

FIG. 5 is a diagram illustrating a handler table for explaining interoperation of a plurality of applications filtering a particular type of data according to an embodiment of the present invention.

BEST MODE FOR CARRYING OUT THE INVENTION

To more easily and effectively utilize a portable device, the present invention enables data to be transmitted/received between one application and another application. Namely, the present invention enables interoperation therebetween. Also, the present invention adopts a method of not hard-coding an association method in a logic of an application. This is to enable an association between download applications or an association between an embedded application and a download application.

In the present invention, each application may perform at least one function of: 1) processing a particular type of data (data processing function), 2) generating a particular type of data (data generating function), and 3) filtering a particular type of data (data filtering function). Also, an application may not perform any function described above.

1) The data processing function includes a function of storing data in a certain area of a terminal or transmitting data to a predetermined server via a network. As an example, the data processing function may include a function of storing image data as a background screen of a terminal or a function of transmitting image data to a predetermined web server.

In the present invention, an application interoperation method is provided which can process generated data in one application by using another application, while a user utilizes the one application.

2) The data generating function includes a function of generating new data or enabling a user to select a portion of existing data. An an example, the data generating function may include a function of taking a picture and generating an image file, or a function of recording a voice and generating a voice file, or a function of enabling a user to select one or two telephone numbers from a phone book.

In the present invention, an application interoperation method is provided, which can generate necessary data in one application by using another application, while a user utilizes the one application.

3) The data filtering function includes a function of receiving a particular type of data and subsequently outputting the same or a different type of data. As an example, the data filtering function may include a function of receiving photo data and adding a frame to the framework of the photo data.

In the present invention, an application interoperation method is provided, which can refine data being utilized in one application by using another application, while a user utilizes the one application.

Figure 1:
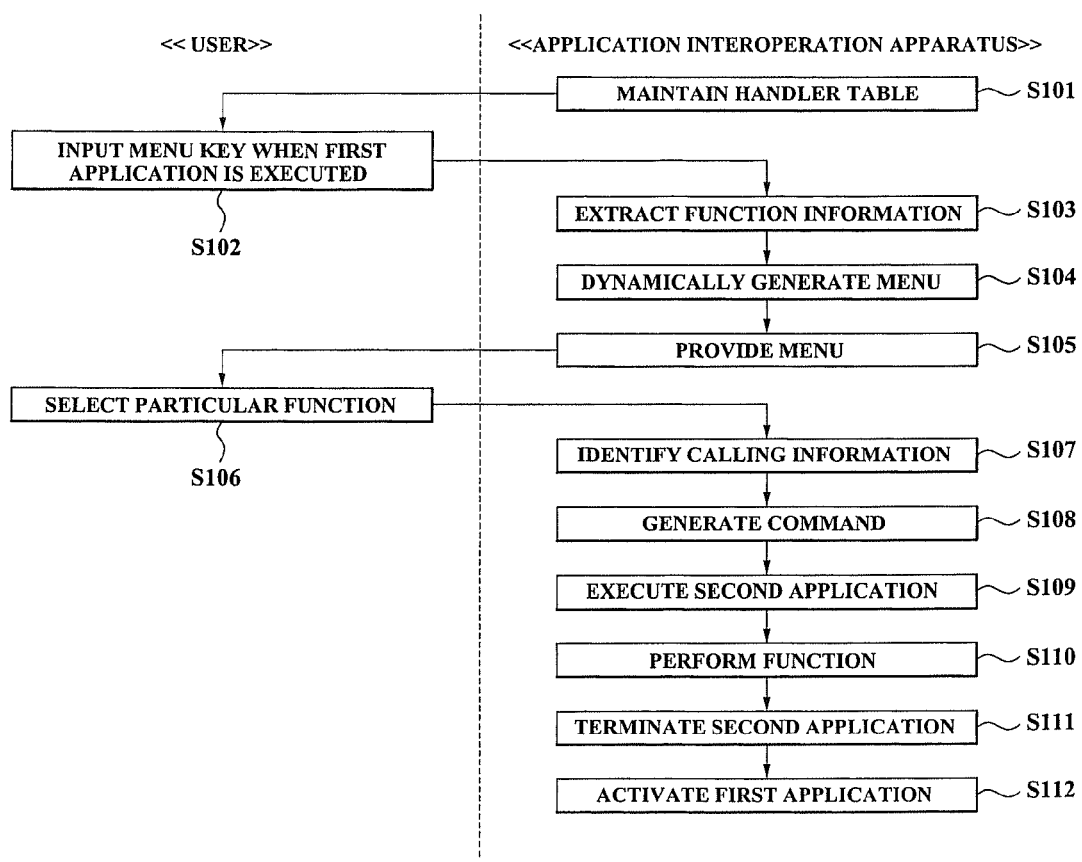
FIG. 1 is a flowchart illustrating an application interoperation method according to an embodiment of the present invention.

FIG. 1 is a flowchart illustrating an application interoperation method according to an embodiment of the present invention.

The application interoperation method according to the present embodiment may be performed in a predetermined application interoperation system. In this instance, an operating system of a portable device and a plurality of applications may interoperate in the application interoperation system.

Accordingly, hereinafter, an application interoperation system referred to as a subject performing each step may designate an application or an operation for the each step. As an example, to generate a dynamic menu according to interoperation of a plurality of applications, an application may transmit its data type to an operating system, directly receive a handler table value corresponding to the data type, and generate the dynamic menu. However, the aforementioned function may be included in the operating system.

In step S101, the application interoperation system maintains a predetermined handler table. FIG. 2 illustrates an example of the handler table. Referring to FIG. 2, the handler table includes data type information 201, function information 202 and calling information 203 which are associated with each application installed in a portable device.

The data type information 201 includes information on input and output types of data which can be processed or generated in the each application. As an example, the data type information 201 may include information, such as "image/jpeg", "text/plain", "phonebook/shortkey", etc., as illustrated in FIG. 2.

The function information 202 includes information on a function that each application may perform with respect to a particular data type. As an example, the function information 202 may include information, such as "post a picture to cyworld", "write a memo in cyworld", "visit a homepage", etc., as illustrated in FIG. 2.

The calling information 203 includes information on a command for calling each application. The command may include an application identifier, an option identifier, target data or a file name, and the like.

As an example, as illustrated in FIG. 2, in calling information such as "cyworld -p %1", "cyworld" is designated as an application identifier capable of identifying an application, "-p" as an option identifier capable of identifying a particular function from a plurality of functions of a "cyworld" application, and "%1" as a location of information such as a file name or target data which the "cyworld" application has to process.

For the maintaining of the handler table (step S101), when the each application is initially executed in a portable device, each application may register the data type information 201, the function information 202 and the calling information 203 in the handler table using an application programming interface (API) of an operating system installed in the portable device.

Also, an application management module of the operating system installed in the portable device may read the data type information 201, the function information 202 and the calling information 203 included in a descriptor file associated with the each application, and register the same in the handler table.

When each application is uninstalled from the portable device, the operating system deletes an item associated with the uninstalled application from the handler table.

In the present specification, a Multipurpose Internet Mail Extensions (MIME) type classification method, which is widely used in the Internet, is utilized as the data type information 201 to specify a data type, but this is only for convenience of description. The data type information 201 is not limited thereto and any type of classification method may be utilized in the present invention.

In step S102, while a first application is active, the application interoperation system receives input information on a menu key of the portable device, from a user.

In step S103, in response to the receipt of the input information, the application interoperation system extracts at least one function information associated with data type information of data which is being processed or requested by the first application, from the handler table.

In this case, step S103 may be a step of extracting a list including at least one function information from the handler table.

In step S104, the application interoperation system dynamically generates a menu including the extracted at least one function information. In step S105, the application interoperation system provides the user with the dynamically generated menu.

In this case, step S104 may further include a step of dynamically adding the extracted list to a basic menu associated with the first application. Also, step S104 may be a step of arranging the extracted at least one function information according to a frequency of use and a most recently used order, and providing the user with the generated menu.

In step S106, the application interoperation system receives selection information on particular function information in the provided menu, from the user. In step S107, the application interoperation system identifies calling information associated with the selected particular function information by referring to the handler table.

In step S108, the application interoperation system generates a predetermined command on the basis of the application identifier or the option identifier which is included in the identified calling information. The application identifier functions to identify an application. The option identifier functions to identify each function, when one application performs a plurality of functions.

An exemplary type and a utilization method of the application identifier and the option identifier will be described later in detail with reference to FIGS. 3 to 5.

In step S109, the application interoperation system executes a second application corresponding to the application identifier included in the command.

According to an embodiment of the present invention, although data is identical to data type information registered in the handler table, the application interoperation system may limit an application interoperation function according to detailed properties of data or whether paid contents whose distribution is limited exists. For this, to determine whether a particular function is active, the application interoperation system may specify a predetermined function and a method of calling the function in the handler table. In this instance, the function determines an appropriateness of an execution function before executing an actual command. In this case, if it takes a long time to call the function, a menu to be displayed to a user may be delayed also. Accordingly, the function may be embodied in a dynamic link library (DLL) separate from the present execution file of an application.

In step S110, the second application recognizes the command and performs a function according to the selected particular function information. When the second application finishes the function, the application interoperation system immediately terminates the second application in step S111, and activates the first application in step S112.

According to the present invention, in steps S101 to S112, in a portable device having a limited input/output device but capable of using various applications, such as a mobile phone, a menu of an application may be dynamically generated according to the application installed in a terminal device and a type of data that a user is currently using. Through this configuration, interoperation of at least two applications is possible. Namely, it is possible to increase utilization of the terminal device and the application.

Hereinafter, various embodiments for embodying the above-described application interoperation method according to the present invention will be described.

Figure 3:
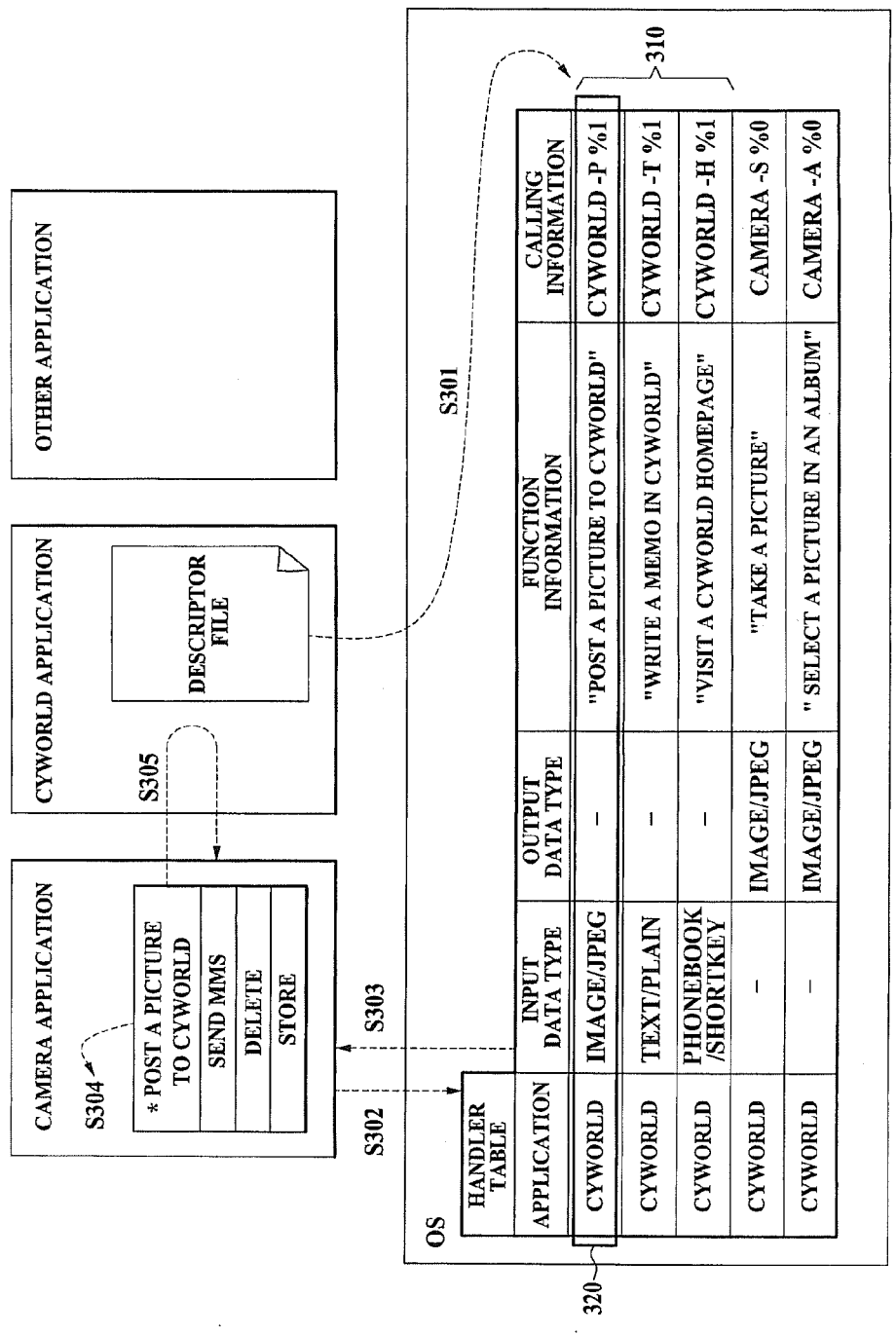
FIG. 3 is a diagram illustrating interoperation of a plurality of applications processing a particular type of data according to an embodiment of the present invention.

FIG. 3 is a diagram illustrating interoperation of a plurality of applications processing a particular type of data according to an embodiment of the present invention.

In FIG. 3, it is assumed that the above-described first application is a "camera" application which is an embedded application having a function of taking a picture or selecting a picture in an album. Also, in FIG. 3, it is assumed that the above-described second application is a "cyworld" application which is a download application having a function of transmitting a JPEG image file or a text message to its blog or homepage.

The "cyworld" application registers input/output data type information, function information and calling information in a handler table of an operating system, in a point in time when the "cyworld" application is registered in a portable device (S301).

Also, an application management module of the operating system installed in the portable device may read data type information, function information and calling information included in a descriptor file associated with the "cyworld" application, and register the same in the handler table, as described above (310).

When a user takes a picture and presses a menu key, the "camera" application requests the operating system for a list of functions capable of processing "image/jpeg" which is a data type included in the "camera" application (S302). The operating system transmits a list including items 320 to the "camera" application (S303). Also, the "camera" application dynamically adds the list to a menu and provides the user with the dynamically generated menu.

When the user selects "post a picture to cyworld" (S304) in the dynamically generated menu, the "camera" application stores the picture in a temporary file. Also, to transmit a name of the temporary file to the "cyworld" application (310), the "camera" application replaces the name of the temporary file with a portion in which "%1" is specified in call information of the handler table, and generates a command below, cyword -p tmp_file_name The "cyworld" application is executed by using the generated command. Also, the "cyworld" application recognizes the option identifier "-p" and the name of the temporary file, executes a function of transmitting the taken picture to a predetermined server without a user's input. The "cyworld" application is terminated immediately after finishing the function (S305). In this instance, the "cyworld" application may enable a user to input additional information such as a comment on the picture. When the "cyworld" application is terminated, the operating system activates the "camera" application again.

As described above, according to the present embodiment, when particular function information selected by a user is a function of transmitting image data, the application interoperation system may store image data, which is being processed by the first application, in a temporary file, and generate a command including an application identifier, an option identifier, and a name of the temporary file. Also, when performing the function according to the selected particular function information, the second application may recognize the option identifier and the name of the temporary file and transmit the image data to a predetermined server.

Hereinafter, an embodiment which may be embodied when particular function information selected by a user is a function of transmitting text data will be described.

When a user finds interesting news while watching news via a WAP browser (first application) installed in his/her portable device and wants to upload the interesting news to his/her blog, the user presses a menu key in the WAP browser. In this case, the WAP browser receives a list of applications capable of processing data in the type of "text/plain" from an operating system, dynamically generates a menu and provides the user with the dynamically generated menu.

If the user selects "write a memo in cyworld" in the dynamically generated menu, the WAP browser converts the memo of a current page into text and transmits the same to the "cyworld" application (second application). In this case, a command may be generated below.

cyword -t "making a living for years with a nail in its forehead . . . "

In this case, unlike image data, the memo stored in a memory buffer does not need to be stored in a separate file and may be immediately transmitted. Accordingly, the "cyworld" application enables a user to modify the stored text data and transmits the same to the user's blog.

As described above, according to the present embodiment, when particular function information selected by a user is a function of transmitting text data, the application interoperation system may convert data, which is being processed by the first application, into text data, and generate a command including an application identifier, an option identifier and text data. Also, the second application may recognize the option identifier and the text image, and transmit the text data to a predetermined server.

Hereinafter, an embodiment which may be embodied when particular function information selected by a user is a function of providing a predetermined webpage will be described.

A user B transmits an SMS to a user A, and the user A presses a menu key with regard to reading the SMS via his/her portable device. In this instance, the SMS includes a text that the user B has added a new text in his/her homepage.

Currently provided data to the user A includes the text of the SMS and a caller (telephone number). Accordingly, an "SMS" application (first application) receives a list of applications capable of processing data in the type of "text/plain" and "phonebook/shortkey", from an operating system, collects the same into one menu and provides the user A with the menu.

When the user A selects "visit a homepage" in the menu, the "SMS" application may generate a command for executing the "cyworld" application (second application) by using currently provided SMS information. The command is generated below.

cyworld -h "honggildong/TEL:TYPE=mobile: 0115555555"

The "cyworld" application accesses a predetermined server according to the command, identifies a blog page of honggildong (a name of the user B transmitting the SMS), and displays the text.

As described above, according to the present embodiment, when particular function information selected by a user is a function of providing a predetermined webpage, the application interoperation system may identify caller information associated with data which is being processed by the first application, and generate a command including an application identifier, an option identifier and caller information. Also, the second application may recognize the option identifier and the caller information and provide a webpage associated with the caller information.

Figure 4:
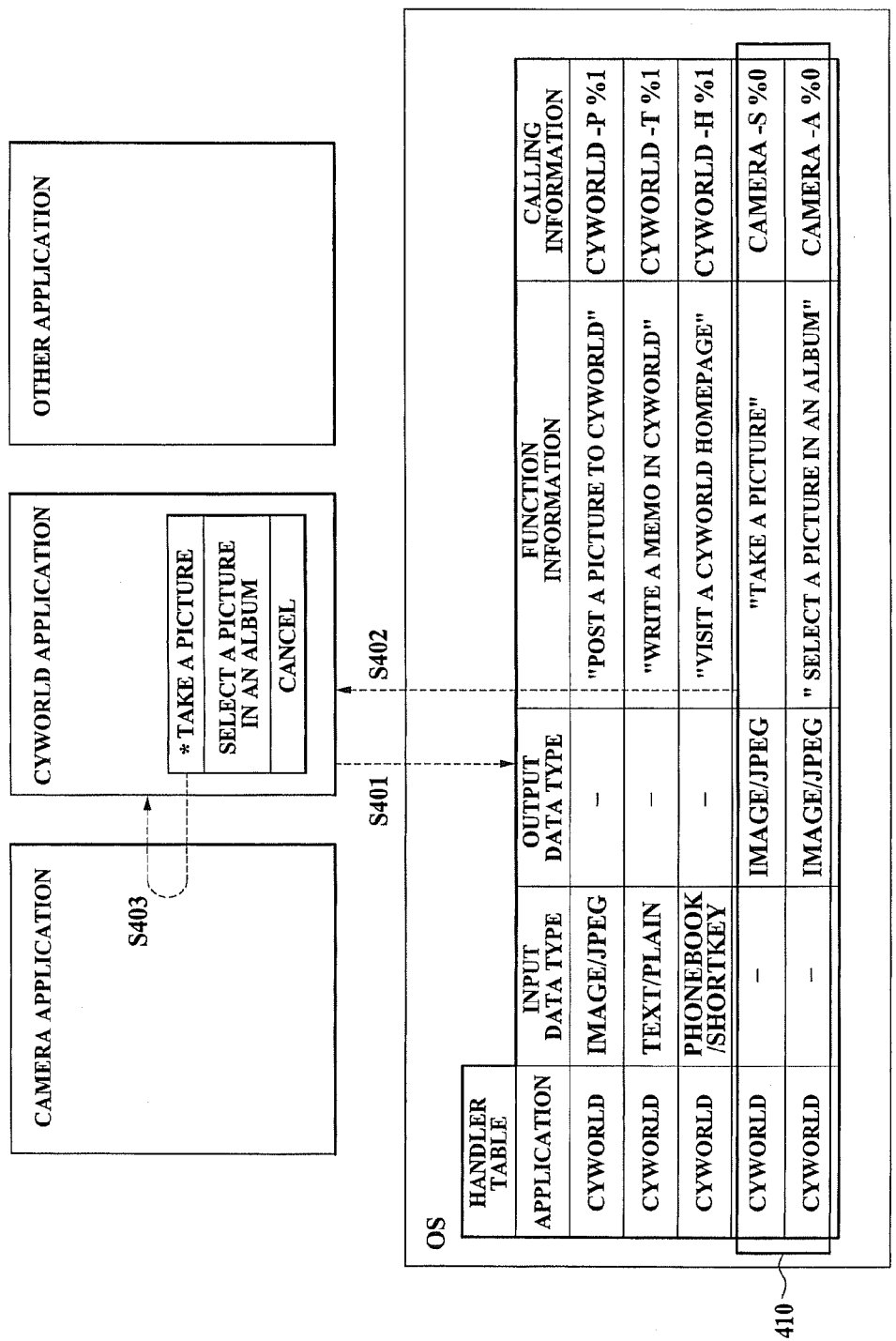
FIG. 4 is a diagram illustrating interoperation of a plurality of applications generating a particular type of data according to an embodiment of the present invention.

FIG. 4 is a diagram illustrating interoperation of a plurality of applications generating a particular type of data according to an embodiment of the present invention.

When generating data according to the present embodiment, another application (second application) is executed in a situation that an application (first application) to use data is initially being executed, and data is obtained. This is different from the data processing according to the above-described embodiment.

When a user initially activates a "cyworld" application (first application) and wants to post a picture while using the "cyworld" application, the user presses a menu key and selects a function, "post a picture". In this case, the "cyworld" application requests an operating system for a list of functions capable of generating "image/jpeg" data (S401). The operating system transmits the list including items 410, to the "cyworld" application (S402).

The "cyworld" application dynamically generates a menu from the list and provides the user with the dynamically generated menu. If the user selects "take a picture" in the dynamically generated menu, the "cyworld" application may generate a command for executing a "camera" application (second application). The command may be generated below.

camera -s tmp_file

The "camera" application takes a picture and stores the same in a file having the designated name, "tmp_file" (S403). Also, when the "camera" application is terminated, the "cyworld" application is reactivated. The "cyworld" application reads the picture from "tmp_file" and posts the same to a predetermined web server.

As described above, according to the present embodiment, when particular function information is a function of uploading data, the application interoperation system may designate a name of a temporary file to store data requested by the first application and generate a command including an application identifier, an option identifier and the name of the temporary file. Also, the second application may recognize the option identifier and the name of the temporary file, generate the requested data, and store the same as the name of the temporary file.

In the present embodiment, the application interoperation system terminates the second application and activates the first application. The first application may read the generated data from the temporary file and upload the same to a predetermined server.

FIG. 5 is a diagram illustrating a handler table for explaining interoperation of a plurality of application filtering a particular type of data according to an embodiment of the present invention.

As illustrated in FIG. 5, in the handler table according to the present embodiment, an application simultaneously includes an input data type and an output data type as its data type information 501. In this instance, a data filtering function may be specified.

With the assumptions that a user takes a picture, decorates the picture using a frame and prints the framed picture, and also reduces the size of the picture, and transmits the picture to a friend in an MMS, the present embodiment will be described.

As illustrated in FIG. 5, data type information 501 of a "photoframe" application for decorating a frame and a "resize" application for changing a size, function information and calling information are registered in the handler table.

When a user selects one picture in an album application (first application) while viewing a picture and presses a menu key, the album application receives a list of functions whose input data type and output data type are in the type of "image/jpeg", from an operating system. Also, the album application dynamically generates a menu including items of "frame effect" and "size change", and provides the user with the dynamically generated menu.

If the user selects "frame effect", the album application identifies a file name of the currently selected picture and designates the file name as argument (%1). Also, the album application generates a command for generating a name of a temporary file and designating the name as argument (%2). According to the command, a "photoframe" application (second application) is executed.

The "photoframe" application reads the picture designated as %1, adds a frame thereto, and stores the results in the file designated as %2. After this, the "photoframe" application is terminated.

The album application is activated again and provides the user with the filtered file as above. In this instance, the user presses a menu key and selects a function, "print". According to the selection, a predetermined print application (second application) is executed, uploads a newly generated file to a predetermined server, and selects a print option. After this, the print application is terminated. In this instance, a method of executing the print application will be the same as in FIG. 3. Accordingly, repeating description related thereto will be omitted herein.

In the reactivated album application, if the user presses a menu key and selects "size change", the "resize" application (second application) is executed in the same method as the method of executing the "photoframe" application. The "resize" application changes the size of the picture into the size designated by the user and stores the changed size. After this, the "resize" application is terminated. The album application is reactivated, selects the filtered picture and provides the user with the filtered picture.

Also, if the user presses a menu key and selects "transmit MMS", a predetermined MMS transmission application (second application) is executed. The MMS transmission application transmits the filtered picture to a friend and is terminated.

As described above, according to the present embodiment, when particular function information selected by a user is a function of filtering data, the application interoperation system may identify a file name of data being processed by the first application and designate a name of another temporary file. Also, the application interoperation system may generate a command including an application identifier, the identified file name and the name of the temporary file. Also, the second application may recognize the identified file name and the name of the temporary file, read the identified file name, filter the data, and store the filtered data as the name of the temporary file.

In the present embodiment, the application interoperation system terminates the second application and activates the first application. Also, the first application may read and display the filtered data from the temporary file.

According to the present invention, there is provided an application interoperation method and system which is not limited to a particular function, and can include input data and output data types, thereby processing, generating and filtering data.

The embodiments of the present invention include computer readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter.

Hereinafter, an application interoperation system according to another embodiment will be described.

Figure 6:
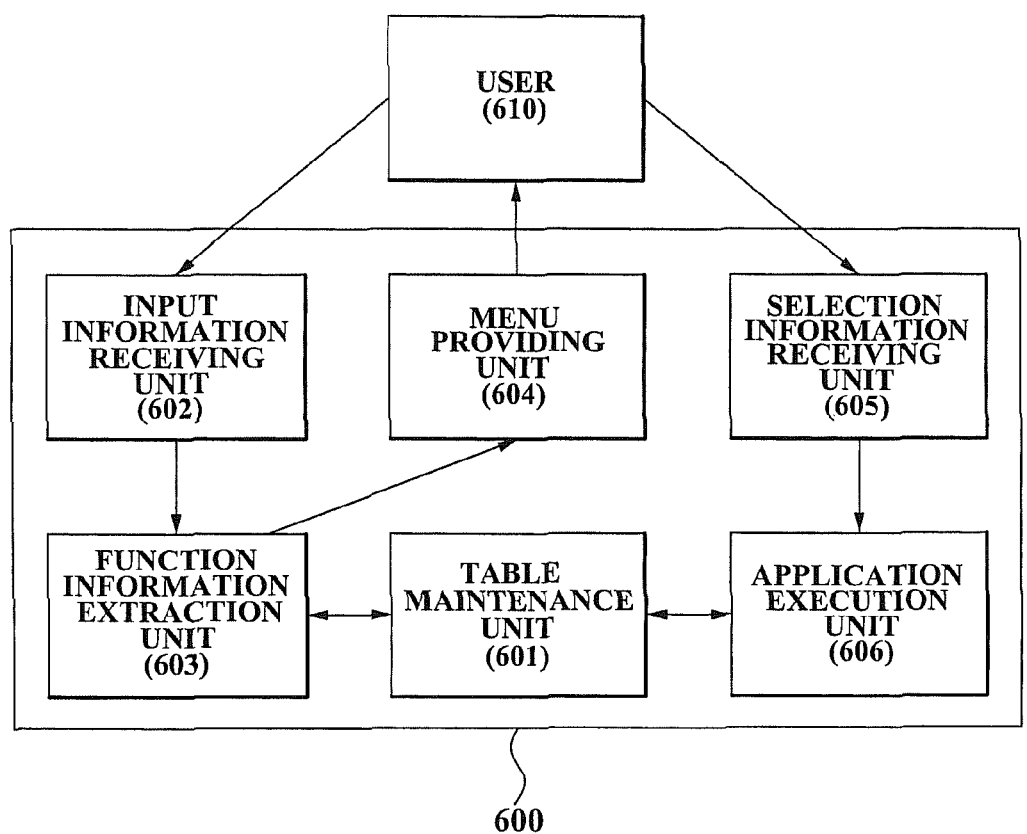
FIG. 6 is a block diagram illustrating a configuration of an application interoperation system according to an embodiment of the present invention.

FIG. 6 is a block diagram illustrating a configuration of the application interoperation system according to the present embodiment.

As illustrated in FIG. 6, an application interoperation system 600 according to the present embodiment includes a table maintenance unit 601, an input information receiving unit 602, a function information extraction unit 603, a menu providing unit 604, a selection information receiving unit 605, and an application execution unit 606.

The table maintenance unit 601 maintains a handler table. The handler table includes data type information, function information and calling information which are associated with each application installed in a portable device. An example of the handler table is illustrated in FIG. 2. This has been described above, thus repeated description related thereto will be omitted herein.

The input information receiving unit 602 receives input information on a menu key of the portable device, from a user 610, while a first application is active.

The function information extraction unit 603 extracts at least one function information associated with data type information of data, which is being processed or requested by the first application, from the handler table, in response to the receipt of the input information. In this case, the function information extraction unit 603 may extract a list including the at least one function information, from the handler table.

The menu providing unit 604 dynamically generates a menu including the extracted at least one function information and provides the user 610 with the generated menu. In this case, the menu providing unit 604 may generate the menu by dynamically adding the extracted list to a basic menu associated with the first application. Also, the menu providing unit 604 may generate the menu by arranging the extracted at least one function information according to a frequency of use and a most recently used order.

The selection information receiving unit 605 receives selection information on particular function information in the provided menu, from the user 610.

The application execution unit 606 identifies calling information associated with the selected particular function information by referring to the handler table and executes a second application on the basis of the identified calling information.

In this case, the application execution unit 606 may generate a predetermined command on the basis of an application identifier or an option identifier included in the identified calling information, and may execute a second application corresponding to the application identifier included in the command. The application identifier functions to identify an application. The option identifier functions to identify each function when one application performs a plurality of functions. An exemplary type and a utilization method of the application identifier and the option identifier have been described in detail with reference to FIGS. 3 to 5.

The second application recognizes the command and performs a function according to the selected particular function information. When the second application finishes the function, the application interoperation system 600 terminates the second application and activates the first application.

As described above, in a portable device having a limited input/output device but capable of using various applications, such as a mobile phone, an application interoperation system according to the present invention may dynamically generate a menu of an application according to the application installed in a terminal device and a type of data that a user is currently using. Through this configuration, interoperation of at least two applications is possible. Namely, it is possible to increase utilization of the terminal device and the application.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

Industrial Applicability

According to the present invention, there is provided an application interoperation method and system, which can dynamically generate a menu of an application according to a type of data that a user is currently using and an application installed in a terminal device, in a portable device having a limited input/output device but capable of utilizing various applications. Accordingly, interoperation of at least two applications is possible. Also, it is possible to improve efficiency of the terminal device and the application.

Also, according to the present invention, there is provided an application interoperation method and system which enables one application to interoperate with another application when transmitting/receiving data, and also adopts a method of not hard-coding an association method in a logic of an application. Accordingly, it is possible to enable an association between download applications or an association between an embedded application and a download application. Also, it is possible to help a user to more easily and effectively utilize a portable device.

Also, according to the present invention, there is provided an application interoperation method and system which can dynamically generate a menu of a currently active application, with respect to a portable device having almost no function corresponding to a shell or having difficulty of switching between an application and a shell.

Also, according to the present invention, there is provided an application interoperation method and system which is not limited to a particular function, and can process, generate and filter data by including both input data and output data types.

Also, according to the present invention, there is provided an application interoperation method and system which can reduce an operation by directly executing another application, while not terminating one application. Accordingly, it is possible to increase efficient utilization of an application.

The invention claimed is:

1. A method for interoperation of a plurality of download and embedded applications on a portable device, the method comprising the steps of:

maintaining a handler table including data type information, function information and calling information which are associated with each download or embedded application of the plurality of download and embedded applications installed in the portable device to enable interoperation of at least two applications of the plurality of download and embedded applications so that when a first application of the plurality of download and embedded applications is used, functionality of other applications of the plurality of download and embedded applications are used with data being processed or requested by the first application;

receiving input information on a menu key of the portable device, from a user, while the first application of the plurality of the download and embedded applications is active;

extracting, in response to the receipt of the input information, at least one function information of the other applications, associated with data type information of the data, being processed or requested by the first application, from the handler table;

dynamically generating a menu including the extracted at least one function information of the other applications to provide the user with the generated menu;

receiving selection information on particular function information, associated with a second application of the plurality of the download and embedded applications, among the provided menu, from the user; and identifying the calling information associated with the selected particular function information by referring to the handler table and executing the second application on the basis of the identified calling information including passing between the first application and the second application the data being processed or requested by the first application.

2. The method of claim 1, wherein the maintaining of the handler table comprises the step of:

registering the function information and the calling information in the handler table, with the data type information which can be processed or generated in each of the plurality of download and embedded applications.

3. The method of claim 2, wherein, in the registering, the function information and the calling information are registered in the handler table with the data type information using an application programming interface (API) of an operating system installed in the portable device, when each of the plurality of download and embedded applications is initially executed in the portable device.

4. The method of claim 3, wherein the maintaining of the handler table further comprises the step of:

the operating system, when each of the plurality of download and embedded applications is uninstalled from the portable device, deleting an item associated with each of the uninstalled plurality of download and embedded applications from the handler table.

5. The method of claim 2, wherein, in the registering, an application management module of an operating system installed in the portable device reads the data type information, the function information and the calling information included in a descriptor file associated with each of the plurality of download and embedded applications and registers the data type information, the function information and the calling information in the handler table.

6. The method of claim 5, wherein the maintaining of the handler table further comprises the step of:

the operating system, when each of the plurality of download and embedded applications is uninstalled from the portable device, deleting an item associated with each of the uninstalled plurality of download and embedded applications application from the handler table.

7. The method of claim 1, wherein, in the extracting, a list including the at least one function information is extracted from the handler table, and the generating of the menu comprises the step of:

dynamically adding the extracted list to a basic menu associated with the first application.

8. The method of claim 1, wherein, in the generating, the extracted at least one function information of the other applications is arranged according to a frequency of use and a most recently used order, to generate the menu.

9. The method of claim 1, wherein the executing of the second application further comprises the steps of:

generating a predetermined command on the basis of an application identifier or an option identifier included in the identified calling information; and executing the second application corresponding to the application identifier included in the command, and the method further comprises the step of:

the second application recognizing the command and performing a function on the data being processed or requested by the first application according to the selected particular function information.

10. The method of claim 9, wherein the function includes information on a data processing function including a data storing function or a data transmitting function, a data generating function and a data filtering function.

11. The method of claim 9, further comprising:

immediately terminating the second application and activating the first application, when the second application completes the function.

12. The method of claim 10, wherein, when the selected particular function information is the function of transmitting image data, the generating a predetermined command comprises the steps of:

storing image data, which is the data being processed by the first application, in a temporary file; and generating the command which includes the application identifier, the option identifier and a name of the temporary file, and in the second application performing the function, the second application recognizes the option identifier and the name of the temporary file, and transmits the image data to a predetermined server.

13. The method of claim 10, wherein, when the selected particular function information is the function of transmitting text data, the generating of the command comprises the steps of:

converting the data, which is being processed by the first application, into text data; and generating the command which includes the application identifier, the option identifier and the text data, and in the second application performing the function, the second application recognizes the option identifier and the text data, and transmits the text data to a predetermined server.

14. The method of claim 10, wherein, when the selected particular function information is the function of providing a predetermined webpage, the generating of the command comprises the steps of:

identifying caller information associated with the data which is being processed by the first application; and generating the command which includes the application identifier, the option identifier and the caller information, and in the second application performing the function, the second application recognizes the option identifier and the identified caller information, and provides a webpage associated with the identified caller information.

15. The method of claim 10, wherein, when the selected particular function information is the function of uploading data, the generating of the command comprises the steps of:

designating a name of a temporary file to store the data requested by the first application; and generating a command which includes the application identifier, the option identifier and the name of the temporary file, and in the second application performing the function, the second application recognizes the option identifier and the name of the temporary file, generates the requested data and stores the same as the name of the temporary file, and the method further comprises the step of:

terminating the second application and activating the first application; and the first application reading the generated data from the temporary file and uploading the generated data to a predetermined server.

16. The method of claim 10, wherein, when the selected particular function information is the function of filtering data, the generating of the command comprises the steps of:

identifying a file name of the data being processed by the first application and designating a name of a temporary file; and generating a command which includes the application identifier, the identified file name and the name of the temporary file, and in the second application performing the function, the second application recognizes the identified file name and the name of the temporary file, reads the identified file name, filters the data, and stores the filtered data as the name of the temporary file, and the method further comprises the steps of:

terminating the second application and activating the first application; and the first application reading and displaying the filtered data from the temporary file.

17. The method of claim 1 wherein the portable device being a mobile phone.

18. A system for interoperation of a plurality of download and embedded applications on a portable device, the system comprising:

a table maintenance unit maintaining a handler table including data type information, function information and calling information which are associated with each application of the plurality of download and embedded applications installed in the portable device to enable interoperation of at least two applications of the plurality of download and embedded applications so that when a first application of the plurality of download and embedded applications is used, functionality of other applications of the plurality of download and embedded applications are used with data being processed or requested by the first application;

an input information receiving unit receiving input information on a menu key of the portable device, from a user, while the first application of the plurality of the download and embedded applications is active;

a function information extraction unit extracting at least one function information of the other applications, associated with data type information of the data, being processed or requested by the first application, from the handler table, in response to the receipt of the input information;

a menu providing unit dynamically generating a menu including the extracted at least one function information of the other applications and providing the user with the generated menu;

a selection information receiving unit receiving selection information on particular function information, associated with a second application of the plurality of the download and embedded applications, among the provided menu, from the user; and an application execution unit identifying calling information associated with the selected particular function information by referring to the handler table and executing the second application on the basis of the identified calling information including passing between the first application and the second application the data being processed or requested by the first application.

* * * * *